June 30, 1925.

C. V. CHAMPION

DISPLAY CASE

Filed June 7, 1924

Inventor
C. V. Champion

By [signature]
Attorney

June 30, 1925.  1,544,218

C. V. CHAMPION

DISPLAY CASE

Filed June 7, 1924  2 Sheets-Sheet 2

Inventor
C. V. Champion

By
Ch. Parken  Attorney

Patented June 30, 1925.

1,544,218

UNITED STATES PATENT OFFICE.

CHARLES V. CHAMPION, OF DANVILLE, ILLINOIS, ASSIGNOR TO C. V. CHAMPION & COMPANY, OF DANVILLE, ILLINOIS, A CORPORATION OF ILLINOIS.

DISPLAY CASE.

Application filed June 7, 1924. Serial No. 718,654.

*To all whom it may concern:*

Be it known that I, CHARLES V. CHAMPION, a citizen of the United States, residing at Danville, in the county of Vermilion and State of Illinois, have invented certain new and useful Improvements in Display Cases, of which the following is a specification.

This invention relates to display cases, and more particularly to a combined display case and toasting or cooking apparatus.

An object of the invention is the provision of a case for storing the sandwiches or the like for vending purposes, having a cooking or toasting compartment communicating with the storage compartment to heat the same.

A further object of the invention is to provide a transparent case in which sandwiches and the like may be displayed in a clean and sanitary manner.

In the accompanying drawings, I have shown one embodiment of the invention. In this showing:

Figure 1:
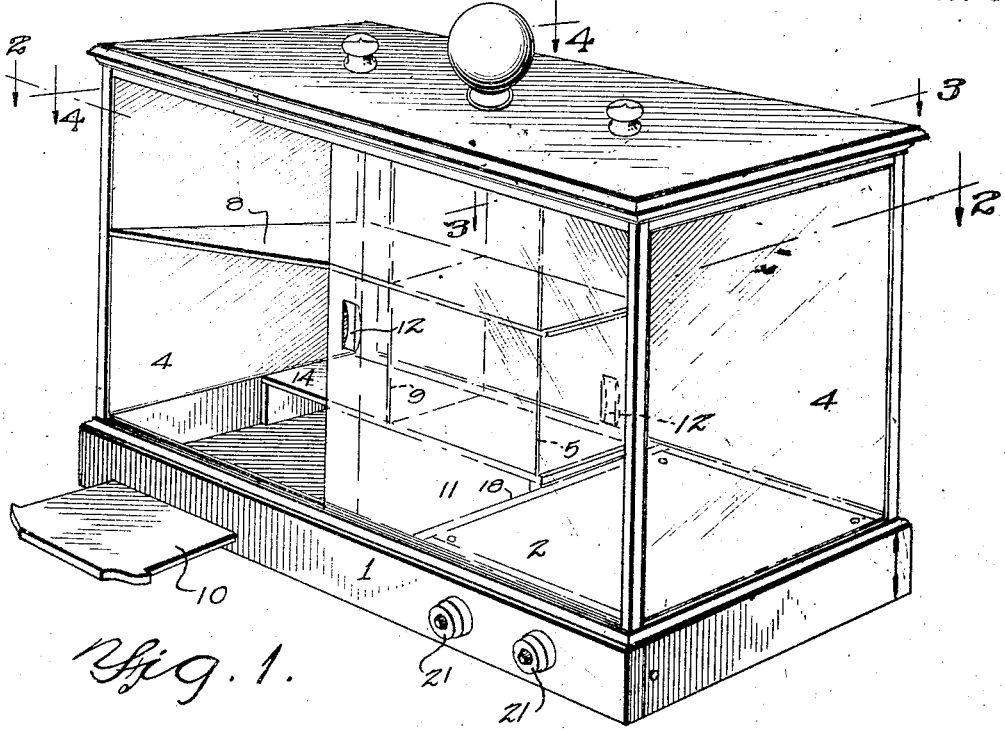
Figure 1 is a perspective view.
Figure 2:
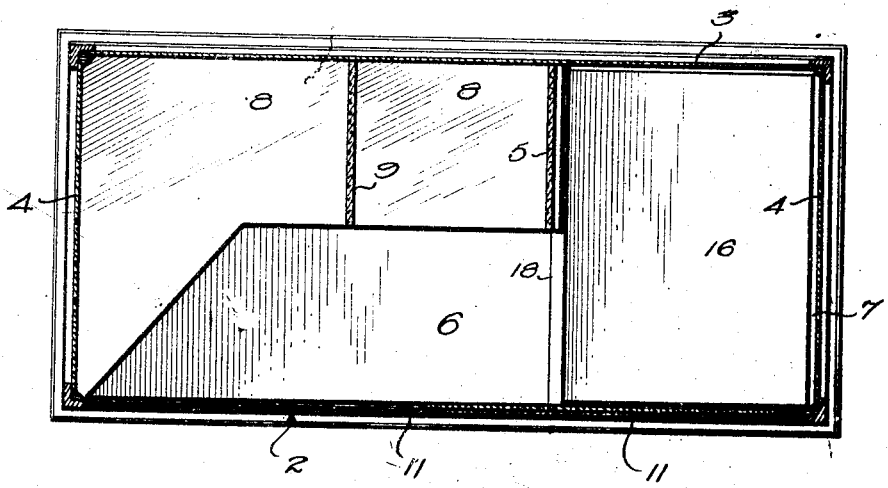
Figure 2 is a horizontal sectional view on line 2—2 of Figure 1.
Figure 4:
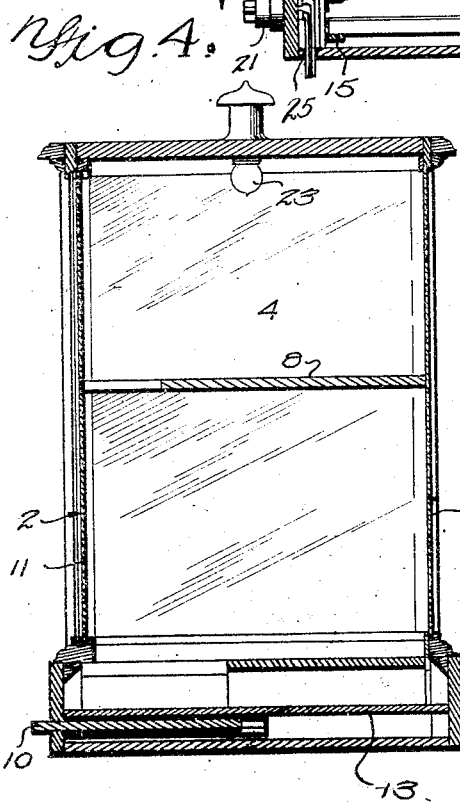
Figure 4 is a similar view on line 4—4 of Figure 1.
Figure 5:
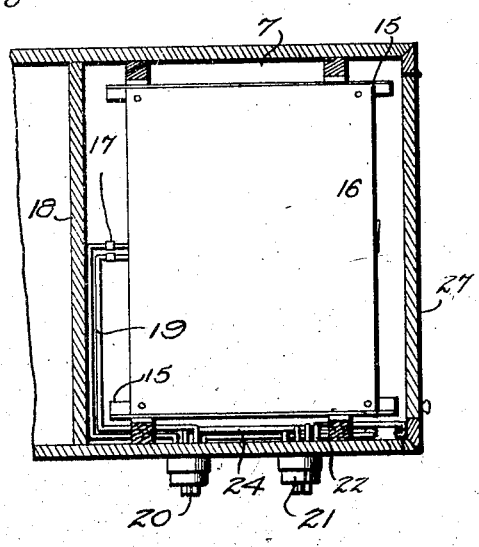
Figure 5 is a horizontal sectional view of the toasting compartment on line 5—5 of Figure 3.

Referring to the drawings, the reference numeral 1 designates the base of the case, which is provided with a front wall 2, a rear wall 3, and end walls 4, formed of glass or other transparent material. Intermediate the ends of the case, there is provided a partition wall 5, extending from the rear and terminating considerable distance from the front of the case, as shown in Figure 2 of the drawings. This provides a storage compartment 6, and a toasting compartment 7. As shown, the storage compartment is provided with suitable horizontal shelves 8, which may be divided by vertical partitions 9. In the front of the storage compartment, a bread board 10 is mounted in an opening in the base and the bread board may be arranged in the inoperative position shown in Figure 4 of the drawings beneath the base. The front of the case is formed in two sections 11 which are slidably mounted and serve as doors to permit access to either compartment. Suitable handles 12 may be provided by forming recesses in the face of the glass. The storage compartment is provided with a bottom 13.

Figure 3:
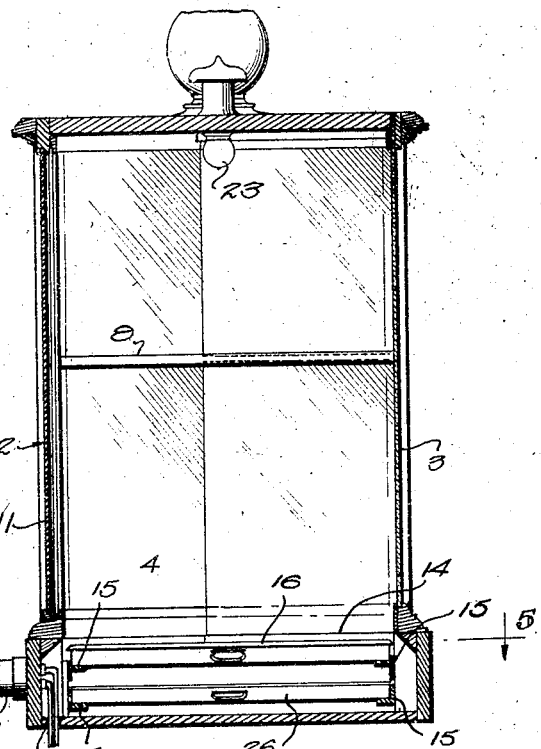
Figure 3 is a vertical sectional view on line 3—3 of Figure 1.

The top of the base is open in the toasting compartment, as indicated at 14 (see Figure 3). Suitable guides 15 are arranged on the front and rear walls. A grill 16 is mounted on an upper set of guides and this grill is provided with suitable heating elements (not shown). These heating elements are provided with plugs 17, adapted to be received in sockets mounted on the wall 18, which is arranged within the base in alinement with the partition 5 between the storage compartment and the toasting compartment. Suitable lead wires 19 are connected to these sockets and extend to a control switch 20 on the front of the casing. A second switch 21 is connected to lead wires 22 which extend to lights 23 in the top of the casing. From the switches, wires 24 extend out through openings 25 in the bottom of the casing and are connected to a suitable source of current, such as an ordinary lamp socket (not shown).

Beneath the grill 16, there is provided a tray 26 slidably mounted on the lower set of guides 15 to permit removal. The base is provided with a hinged door 27 on the adjacent end to permit removal of the grill 16 and the tray 26.

In operation, the sandwiches are arranged and placed in the storage compartment 6 to keep them warm until sold. The material of which the sandwich is to be formed may be cooked or toasted on the grill 16 before the sandwiches are made and if desired, the bread may also be toasted. The partition wall 5 extending only partially across the case, permits a certain amount of heat to pass into the storage compartment to keep the contents warm.

It is to be understood that the form of my invention herewith shown and described is to be taken as a preferred example of the same, and that various changes in the shape, size, and arrangement of parts may be resorted to without departing from the spirit of the invention or the scope of the subjoined claims.

I claim:

1. In a device of the character described, a base, front, rear and end walls arranged on said base, a partition extending partially from the rear to the front forming a toasting compartment and a storage compartment, a bottom arranged in said storage compartment, guides arranged on the front and rear walls of said toasting compartment, and a grill slidably mounted on said guides.

2. In a device of the character described, a base, front, rear and end walls arranged on said base, a partition extending partially from the rear to the front forming a toasting compartment and a storage compartment, a bottom arranged in said storage compartment, guides arranged on the front and rear walls of said toasting compartment, a grill slidably mounted on said guides, and a door arranged in the end of said base to permit removal of said grill.

3. In a device of the character described, a base, transparent front, rear, and end walls arranged on said base, a transparent partition extending from the rear wall and spaced from the front, said partition forming a toasting compartment and a storage compartment, a bottom in said storage compartment substantially level with the top of the base, transparent shelves arranged in said storage compartment, and a grill arranged in said toasting compartment in substantially the same plane with the bottom of the storage compartment.

In testimony whereof, I affix my signature in presence of a witness.

CHARLES V. CHAMPION.

Witness:
J. THOS. DICKINSON.